US008985401B2

(12) United States Patent
Welp

(10) Patent No.: US 8,985,401 B2
(45) Date of Patent: Mar. 24, 2015

(54) FLUID DISCHARGE HEAD

(75) Inventor: Gisbert Welp, Sundern (DE)

(73) Assignee: MeadWestvaco Calmar GmbH, Richmond, VA (US)

( * ) Notice: Subject to any disclaimer, the term of this patent is extended or adjusted under 35 U.S.C. 154(b) by 693 days.

(21) Appl. No.: 12/997,078

(22) PCT Filed: May 26, 2009

(86) PCT No.: PCT/EP2009/003721

§ 371 (c)(1),
(2), (4) Date: Dec. 9, 2010

(87) PCT Pub. No.: WO2009/149825

PCT Pub. Date: Dec. 17, 2009

(65) Prior Publication Data

US 2011/0084100 A1 Apr. 14, 2011

(30) Foreign Application Priority Data

Jun. 10, 2008 (DE) ......................... 10 2008 027 598
Jun. 10, 2008 (DE) ......................... 10 2008 027 600

(51) Int. Cl.
*B65D 88/54* (2006.01)
*G01F 11/00* (2006.01)
(Continued)

(52) U.S. Cl.
CPC ........... *B05B 11/0067* (2013.01); *B05B 1/3436* (2013.01); *B05B 1/3473* (2013.01); *B05B 11/0072* (2013.01); *B05B 11/0075* (2013.01); *B05B 11/3018* (2013.01)
USPC .................. 222/321.8; 222/321.1; 222/321.6; 222/321.7; 222/321.9; 239/333; 137/494; 137/509

(58) Field of Classification Search
USPC ........... 222/189.09, 321, 321.6, 321.7, 321.9, 222/321.1, 321.8, 340; 239/583, 333; 137/494, 509
See application file for complete search history.

(56) References Cited

U.S. PATENT DOCUMENTS 2,180,702 A * 11/1939 Berwick et al. ............... 417/497
5,147,073 A 9/1992 Cater
(Continued)

FOREIGN PATENT DOCUMENTS

| | | |
|---|---|---|
| DE | 19840723 | 3/2000 |
| WO | WO2007009617 | 1/2007 |
| WO | WO2009149826 | 12/2009 |

OTHER PUBLICATIONS

Third Party Observation for EP Application No. 09761388.9 mailed Jul. 17, 2014 with English Translation.

*Primary Examiner* — Len Tran
*Assistant Examiner* — Alexander Valvis
(74) *Attorney, Agent, or Firm* — MeadWestvaco Intellectual Property Group

(57) ABSTRACT

Fluid discharge head having a discharge nozzle (5) which has a discharge opening (6) in which an inner sleeve (7) is arranged, which has a medium duct (8) and holds a spring-loaded valve body (10) automatically closing the discharge opening (6), the valve body (10) being formed as a cylindrical piston, which can be displaced axially in a cylinder chamber (12) formed by the inner sleeve (7), an upper (14) and a lower valve seat (15) being provided for the piston ends (16, 17), and the valve body (10) having an intermediate valve plate (18), which forms a chamber bottom of a pressure chamber (19) connected to the medium duct (8), and, in order to open the upper valve seat (14), a medium discharge pressure which is higher than a spring force holding the valve body (10) closed can be set in the pressure chamber.

11 Claims, 8 Drawing Sheets

Figure 1:
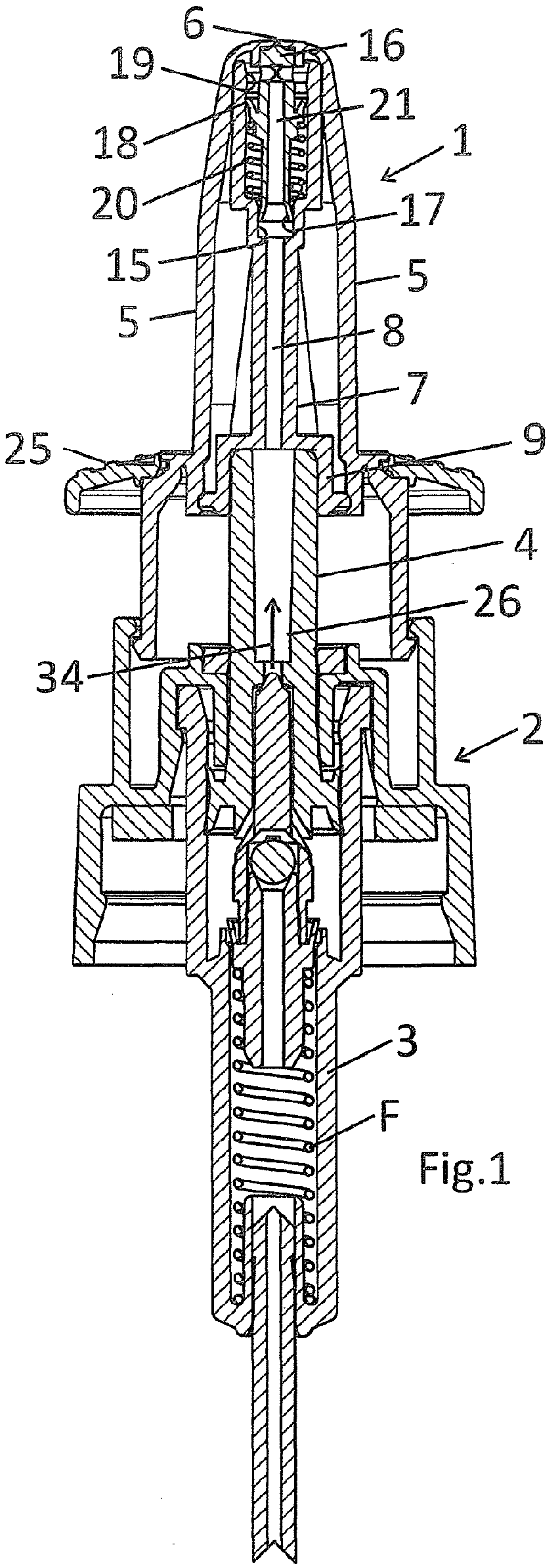

(51) Int. Cl.

| | |
|---|---|
| ***A62C 11/00*** | (2006.01) |
| ***B05B 9/043*** | (2006.01) |
| ***F16K 31/12*** | (2006.01) |
| ***F16K 31/36*** | (2006.01) |
| ***B05B 11/00*** | (2006.01) |
| ***B05B 1/34*** | (2006.01) |

(56) References Cited

U.S. PATENT DOCUMENTS

| | | | | |
|---|---|---|---|---|
| 5,195,665 | A | 3/1993 | Lina | |
| 5,641,097 | A * | 6/1997 | Renault et al. | 222/321.2 |
| 5,988,449 | A | 11/1999 | Fuchs et al. | |
| 6,053,368 | A * | 4/2000 | Geimer | 222/189.09 |
| 6,062,433 | A | 5/2000 | Fuchs | |
| 6,189,739 | B1 * | 2/2001 | von Schuckmann | 222/182 |
| 6,308,867 | B1 * | 10/2001 | Wolter | 222/321.6 |
| 6,443,370 | B1 * | 9/2002 | Brulle et al. | 239/333 |
| 6,578,741 | B2 * | 6/2003 | Ritsche et al. | 222/153.13 |
| 6,669,056 | B2 * | 12/2003 | Bistolfi | 222/145.6 |
| 6,722,858 | B2 * | 4/2004 | Yoshimura et al. | 417/313 |
| 6,769,576 | B2 * | 8/2004 | Ichikawa | 222/321.5 |
| 6,824,020 | B1 * | 11/2004 | Petit | 222/321.6 |
| 6,851,583 | B2 * | 2/2005 | Masuzzo et al. | 222/321.6 |
| 7,104,469 | B2 * | 9/2006 | Merk et al. | 239/302 |
| 7,287,672 | B2 * | 10/2007 | Garcia | 222/321.8 |
| 7,708,171 | B2 * | 5/2010 | Regan et al. | 222/389 |
| 7,828,231 | B2 | 11/2010 | Harms | |
| 8,083,159 | B2 | 12/2011 | Leuliet et al. | |
| 2003/0183655 | A1 * | 10/2003 | Padar | 222/321.9 |
| 2004/0238574 | A1 * | 12/2004 | Merk et al. | 222/321.6 |
| 2004/0256414 | A1 * | 12/2004 | Graf | 222/321.1 |
| 2007/0125809 | A1 * | 6/2007 | Regan et al. | 222/389 |
| 2007/0164054 | A1 * | 7/2007 | Shu | 222/321.6 |
| 2011/0089197 | A1 * | 4/2011 | Welp | 222/321.2 |

* cited by examiner

FLUID DISCHARGE HEAD

CROSS-REFERENCE TO RELATED APPLICATIONS

This application claims the benefit of German Application No. 102008027600.6, entitled "Fluidaustragkopf," filed 10 Jun. 2008, of German Application No. 102008027598.0, entitled "Fluidaustragkopf," filed 10 Jun. 2008, and of International Application Number PCT/EP09/003,721, entitled "Fluidaustragkopf," filed 26 May 2009, and incorporates each of those applications herein by reference in their entireties.

The invention relates to a fluid discharge head.

WO2007/009617 A1 discloses a fluid discharge head having a discharge nozzle which has a discharge opening and which holds an inner sleeve. Arranged in the inner sleeve is an inner body, which delimits an outlet duct and has a connecting element for providing a connection to the mating piece of a discharge device. At the front end adjacent to the discharge opening, the inner sleeve has a sealing face, against which a valve plug located on the inner body and closing the outlet duct is spring-prestressed. Therefore, a valve is integrated into the discharge head, in which the valve closure is implemented by a relative movement when actuated by the user. Such a valve can be dimensioned to be small. However, because of the problems of the fluid discharge head sucking back, security against penetration of germs and bacteria is not adequately provided. In order that no germs or other contaminants can penetrate into the system through the discharge opening, the use of oligodynamic substances can therefore be necessary. The use of such oligodynamic substances when conservation-medium-free media are employed is disadvantageous.

It is therefore an object of the invention to devise a fluid discharge head which permits an improved valve closure.

This object is achieved by the features of Claim 1.

By this means, a fluid discharge head with a valve closure is devised in which the problems of sucking back as the valve is closed are eliminated by a positive pressure valve. A lightning closure directly after a spraying surge ensures that neither germs nor other contaminants can penetrate into the fluid discharge head through the medium outlet opening. The force for opening the valve is applied directly via the medium conveyed into the discharge head. An adjustable medium pressure opens the spring-loaded valve closure by moving the valve body counter to a spring force. The medium conveyed into the fluid discharge head by means of a discharge device is led into a closed and sealed space in the cylinder chamber, from which it flows to the medium outlet. The chamber applies a quantity of medium to the medium outlet, the medium surface of which, in conjunction with the medium forward pressure, opposes the penetration of bacteria and contaminants. Small dimensioning of the valve closure is possible.

The intermediate valve plate, on which the spring acts in order to press the valve body into the upper valve seat, preferably has a sealing strip to seal off the bottom of the cylinder chamber. Given an adequate medium pressure in the cylinder chamber, the bottom of which forms the intermediate valve plate, the upper valve seat lifts off when the force on the intermediate valve plate brought about by the medium forward pressure is greater than the spring force holding it closed. By means of the step-up ratio of the projected areas and of the rising pressure within the cylinder chamber, an influence can be exerted on the opening and closing behaviour.

The lower valve seat preferably has the function of a stuffing box packing for the medium duct, on which the moving lower end of the valve body bears in a sealing manner.

Further refinements of the invention can be gathered from the following description and the subclaims.

The invention will be explained in more detail below by using the exemplary embodiments illustrated in the appended figures.

Figure 2:
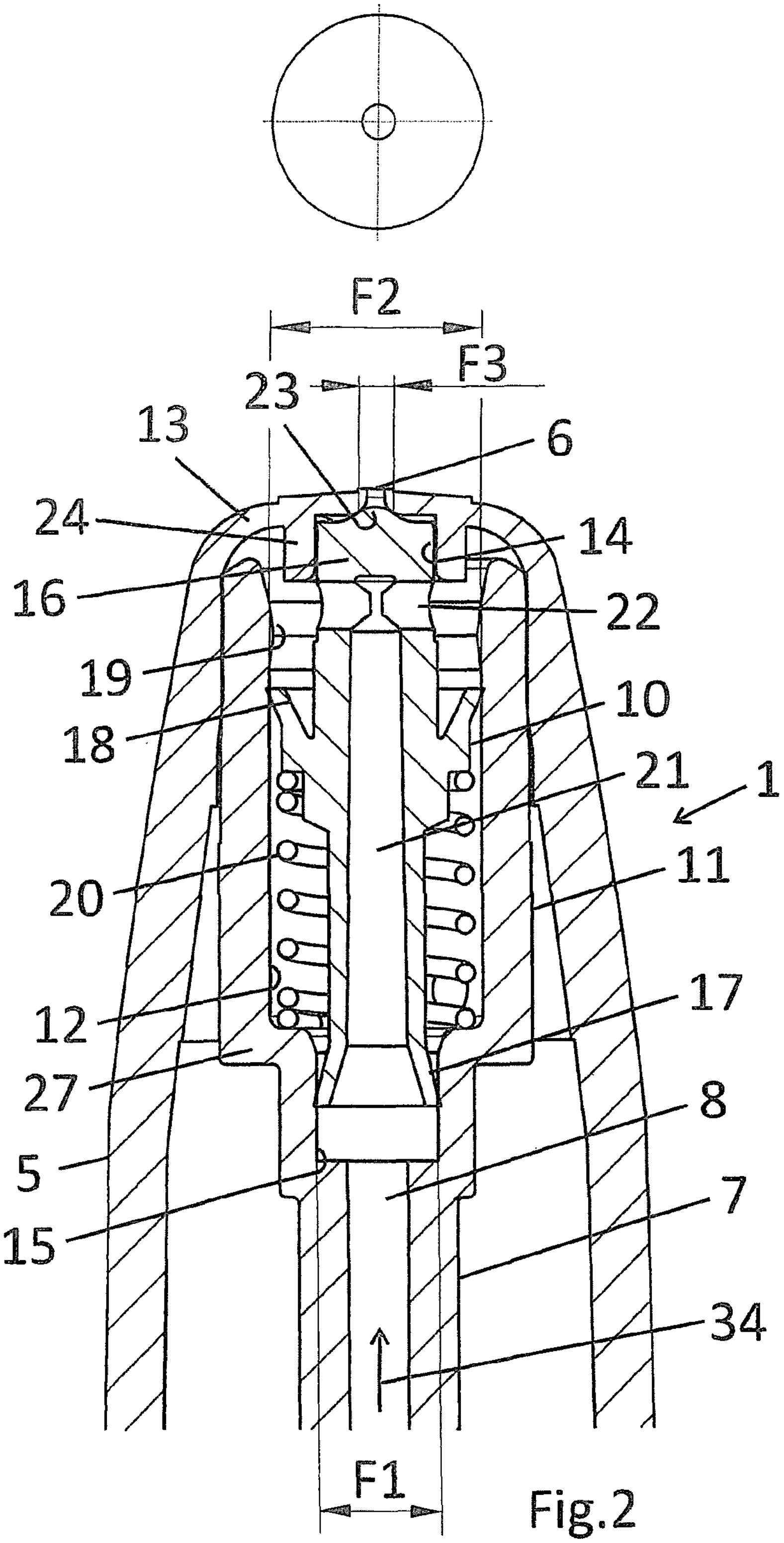
Figure 3:
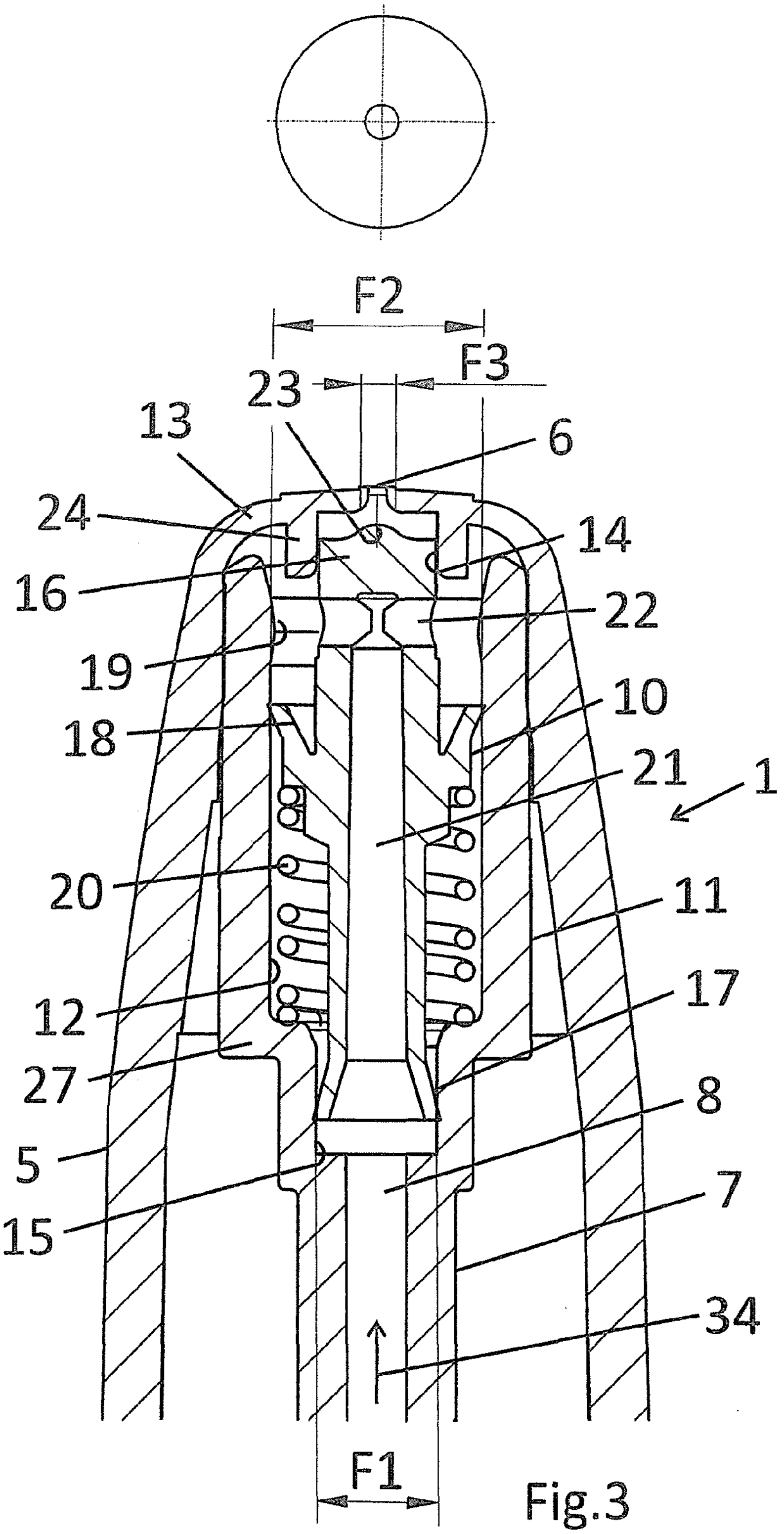
Figure 4:
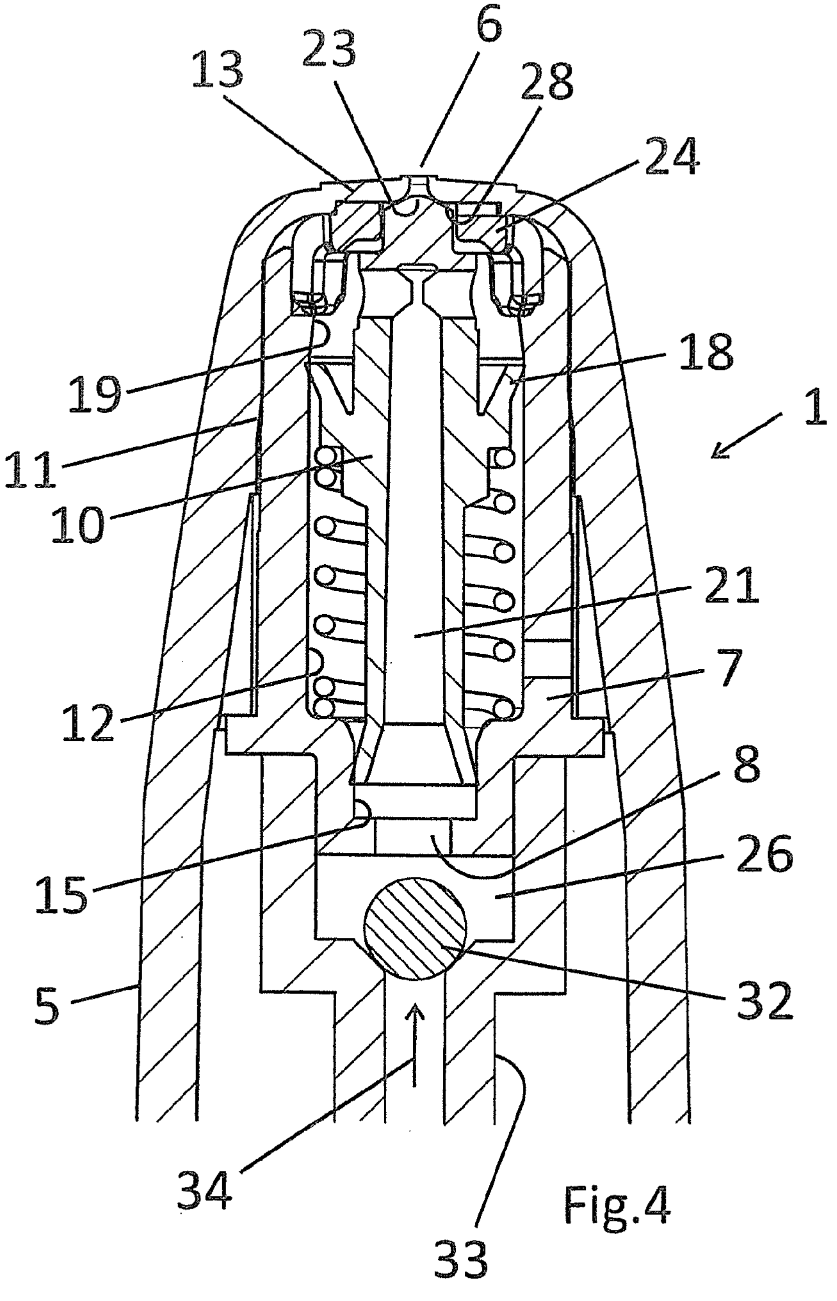
Figure 5:
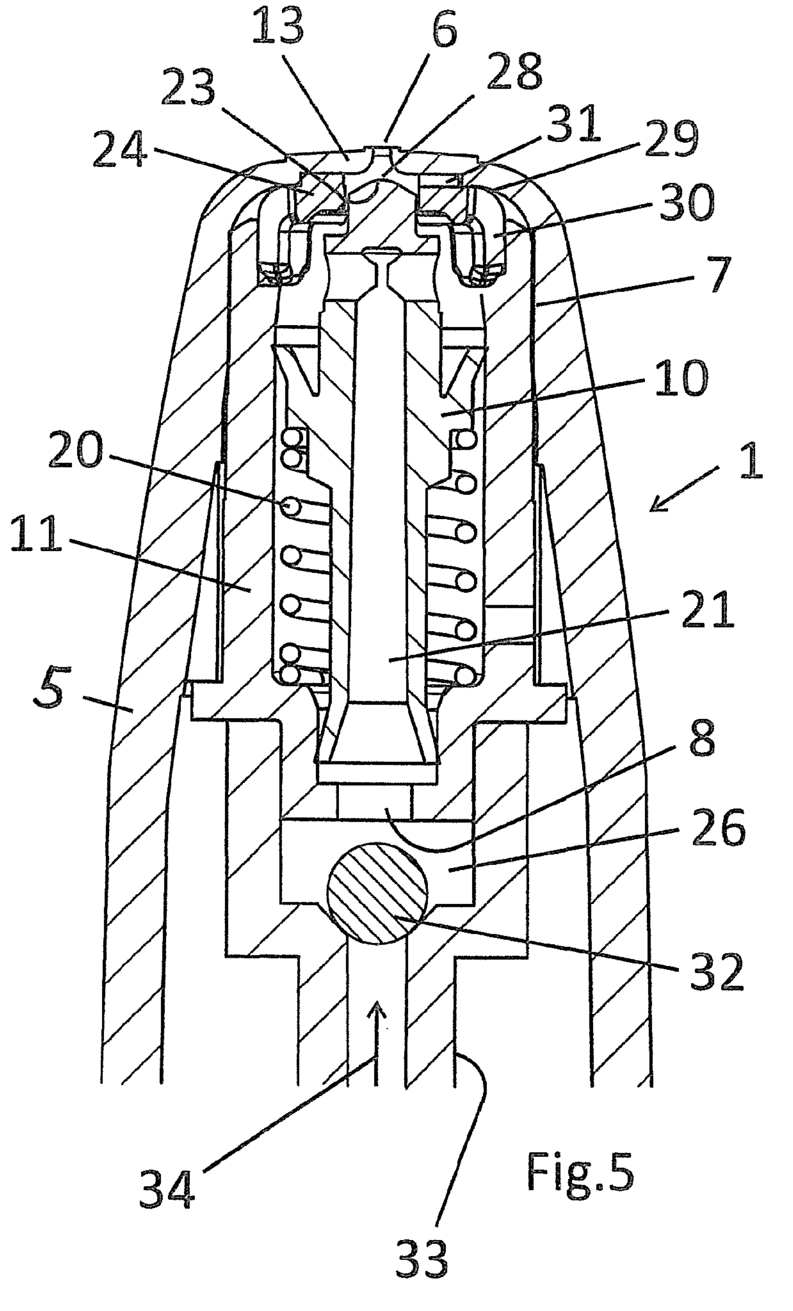
Figure 6:
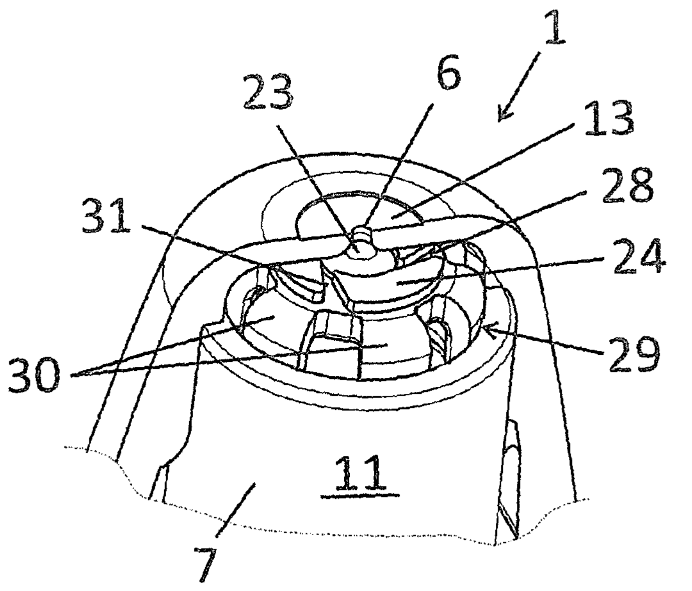
Figure 7:
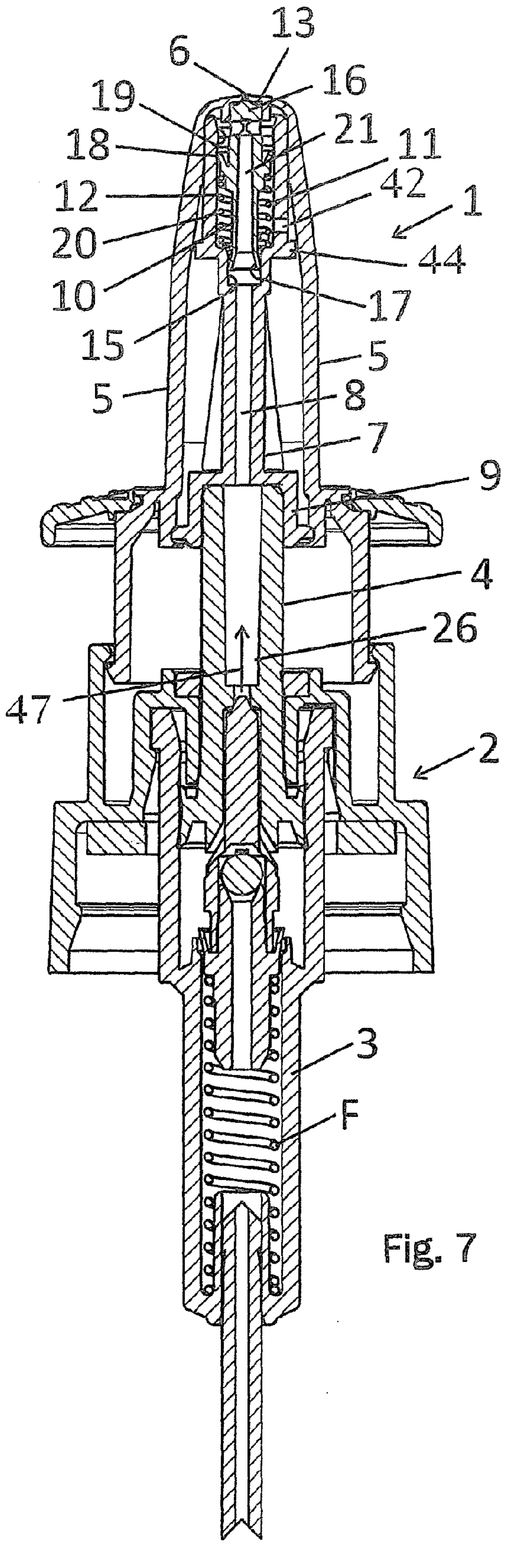
Figure 8:
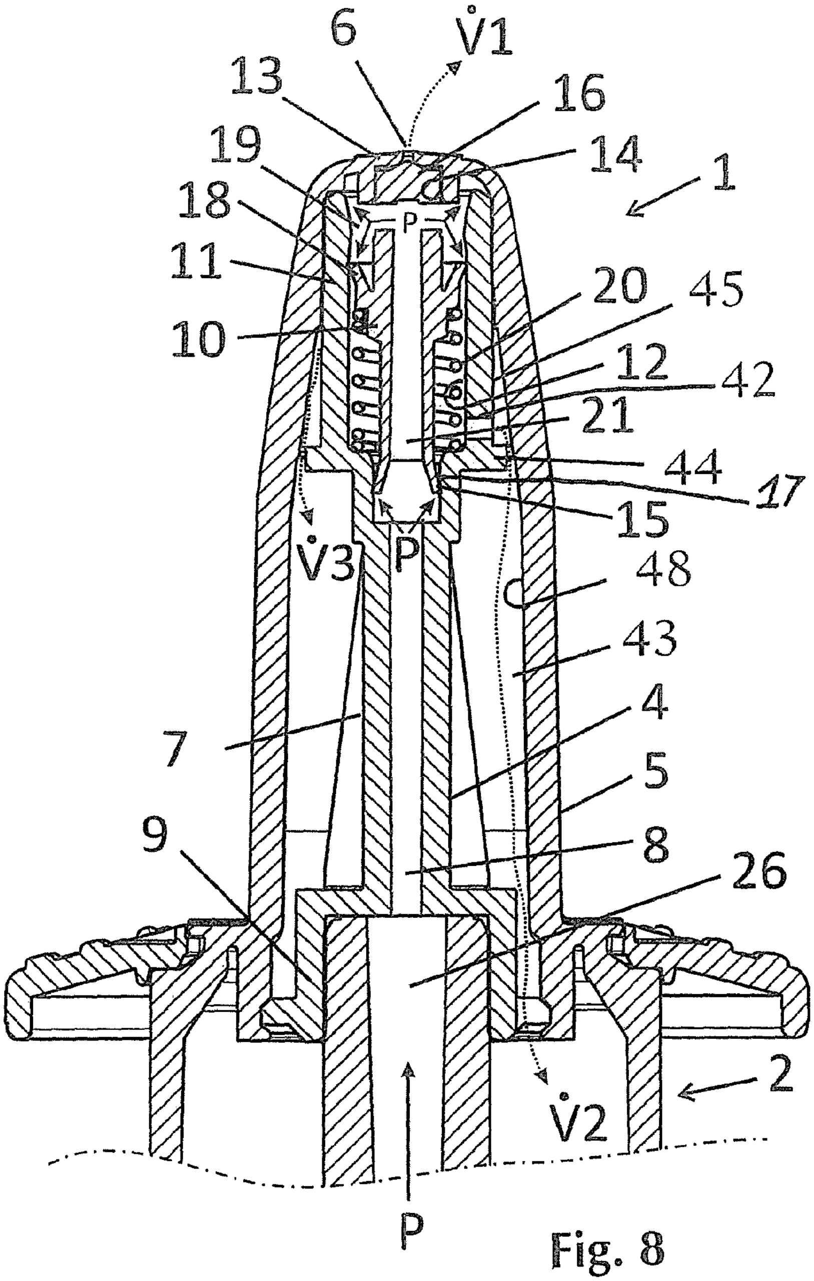

FIG. 1 shows, schematically in section, a fluid discharge head according to a first exemplary embodiment, FIG. 2 shows, schematically, the valve closure of the fluid discharge head according to FIG. 1 in an enlarged illustration, FIG. 3 shows the fluid discharge head according to FIG. 2 with the valve closure open, FIG. 4 shows, schematically in section, a fluid discharge head according to a second exemplary embodiment, FIG. 5 shows the fluid discharge head according to FIG. 4 with the valve closure open, FIG. 6 shows, schematically, a plan view of the fluid discharge head according to FIG. 4 with the discharge nozzle partly removed FIG. 7 shows, schematically in section, a fluid discharge head according to a third exemplary embodiment, FIG. 8 shows, schematically, the fluid discharge head according to FIG. 7 with possible routes of the pressure drop.

FIGS. 1 to 3 show a fluid discharge head 1 for use with a discharge device 2, the discharge device 2 comprising a medium store, not shown, for fluid, in which the medium is placed under pressure or from which the medium is discharged via a medium pump 3, in particular a thrust piston pump. The discharge device 2 has a mating piece 4, to which the fluid discharge head 1 can be fitted. The discharge device 2 with fluid discharge head 1 put in place forms a dispenser for in particular liquid media.

The fluid discharge head 1 and the discharge device 2 can be moved axially towards each other for the purpose of discharge actuation or shortening of the dispenser. When an actuating force is released, they return back in the opposite direction to the initial position according to FIG. 1 by means of a spring F.

The fluid discharge head 1 comprises a discharge nozzle 5 having a discharge opening 6 which, here, is provided at the end of the discharge nozzle 5. The discharge nozzle 5 holds an inner sleeve 7, which delimits a medium duct 8 which adjoins a discharge section 26 of a medium guide 34 in the form of duct sections and/or medium spaces adjoining one another and located within the fluid discharge head 1.

The inner sleeve 7 can additionally have a connecting element 9 for providing a connection to the mating piece 4 of the discharge device 2. The inner sleeve 7 is formed in the shape of a pot at its end 11 facing the discharge opening 6, in order to form a cylinder chamber 12 in conjunction with the front end 13 of the discharge nozzle 5, which has the discharge opening 6. To close the discharge opening 6, the inner sleeve 7 holds a spring-loaded valve body 10 automatically closing the discharge opening 6.

The valve body 10 is formed as a cylindrical piston, which can be displaced axially in the cylinder chamber 12 formed by the inner sleeve 7 on the top side. The movable valve body 10 subdivides the cylinder chamber 12 into an upper and a lower chamber section. The upper chamber section forms a pressure chamber 19, which is connected to the medium duct 8 and can be opened and closed with respect to the discharge opening 6. The lower chamber section is used to hold a spring element, in particular a compression spring 20, for the pressure loading of the valve body 10, in order that the latter closes the discharge opening 6 with a prestressing force as a spring-loaded valve body 10.

For the valve body 10, an upper valve seat 14 and a lower valve seat 15 are provided, which at the same time can serve as guide bearings for the piston ends 16, 17. At least one of the two valve seats 14, 15 preferably serves as a guide bearing. The piston of the valve body 10 has an intermediate valve plate 18, which forms a chamber bottom of the pressure chamber 19 connected to the medium duct 8. The intermediate valve plate 18 seals off the pressure chamber 19 with respect to the upper valve seat 14. The intermediate valve plate 18 is further preferably used to guide the movement of the valve body 10 in the cylinder chamber 12. The intermediate valve plate 18 is preferably formed as a peripheral sealing lip, which guides the valve body 10 in the cylinder chamber 12 during its upward and downward movement. The intermediate valve plate 18 forms a chamber bottom of the pressure chamber 19, which can be moved axially with respect to the discharge opening 6, specifically as a result of movement of the valve body 10. The volume content of the pressure chamber 19 consequently varies, the enlargement in volume during the opening of the discharge opening 6 being filled by the medium pressure in the passage duct 21, so that no germs can penetrate. The reduction in the size of the volume content of the pressure chamber 19 as the discharge opening 6 is closed has the effect of a residual medium thrust, which prevents the penetration of germs.

To open the upper valve seat 14, a medium discharge pressure which is higher than a spring force of the compression spring 20 holding the valve body 10 closed can be set in the pressure chamber 19. FIG. 1 and FIG. 2 show a discharge opening 6 closed by the valve body 10.

Medium flows through the valve body 10, for which purpose the valve body 10 has a passage duct 21, which connects the medium duct 8 to the pressure chamber 19. The passage duct 21 is preferably led centrally through the valve body 10. The passage duct 21 is formed by a rising tube section which, on the outlet side, preferably ends in an annular groove 22, which leads the passage duct 21 over into the pressure chamber 19.

The lower valve seat 15 preferably has the function of a stuffing box packing, in which a piston end 17 of the valve body 10, broadened in the manner of a funnel, bears in a sealing manner, specifically during a downward and upward movement of the valve body 10.

The upper valve seat 14 preferably comprises a slotted bush 24, which is able to guide the upper piston end 16 during the opening and closing movement, but on the other hand permits flow towards the discharge opening 6 through bush slots when the upper piston end 16 having a preferably rounded sealing face 23 lifts off and opens the discharge opening 6 with respect to the pressure chamber 19. The discharge opening 6 can have one or more openings, depending on which spray pattern or jet pattern is desired. The bush 24 can form a swirl chamber.

The bush 24 is preferably formed on the discharge nozzle 5 and, to this end, is made to be self-supporting. The pressure chamber 19 surrounds the discharge opening 6 with a forward-flow reservoir of fluid which, between the intermediate valve plate 18 and the upper valve seat 14, provides a standing height of fluid as a forward-flow reservoir adjacent to the discharge opening 6. Before the valve body 10 lifts off the upper valve seat 14, the medium is present with a high initial pressure. This pilot pressure in the pressure chamber 19 is higher than the surrounding pressure, so that, when the discharge opening 6 is opened, the medium present emerges immediately. The pilot pressure is preferably set in a range between 1.5 and 2.3 bar.

FIG. 3 shows the opened discharge opening 6. For this purpose, the valve body 10 has executed a movement away from the discharge opening 6, which means that the sealing face 23 has lifted off. The medium present in the pressure chamber 19 then forces its way out of the discharge opening 6 through the chamber 28 formed between the top end of the valve body 10 and the front end 13 of the discharge nozzle 5. The chamber 28 is preferably a swirl chamber. In this case, the quantity discharged is not restricted to the volume content of the pressure chamber 19, since medium is conveyed as far as the end of a pump or pressure stroke via the passage duct 21 and is discharged.

The opening characteristic is determined by the step-up ratio of the projected areas F1 and F2, F1 being determined by the valve seat 15 for the lower piston end 17 and its diameter, while F2 is determined by the pressure chamber 19 and the diameter of the intermediate valve plate 18. F3 determines the opening width of the discharge opening 6 in the region of the sealing face 23 at the upper piston end of the valve body 10.

The compression spring 20 is inserted into the cylinder chamber 12 and is supported at one end on an underside of the intermediate valve plate 18 and a shoulder 27 of the cylinder chamber 12 adjacent to the valve seat 15.

The valve body 10 can be displaced axially, counter to the spring force of the compression spring 20, in order to open and close the upper valve seat 14. The axial stroke can be limited by a spring compression and the spring force rising as a result and/or by a stop, which can be provided on the lower valve seat 15.

The inner sleeve 7 is seated arranged fixedly in the discharge nozzle 5, it being possible for the fixing to be made detachably via a snap-in connection.

The discharge nozzle 5 has finger contact surfaces 25 for manual actuation by applying actuating forces to the mating piece 4. The medium duct 8 of the discharge nozzle 5, which is used to pass on the fluid discharged from the medium container, adjoins a discharge section 26 in the form of a discharge duct belonging to the mating piece 4. The opening width of the duct 26 can be chosen and can be matched to the desired delivery quantity via insert pieces. The ducts 26, 8 and 21 are preferably placed one above another along a central axis.

The discharge nozzle 5 here has the form of a nasal olive, in order to be able to be placed on the mating piece 4 as a nasal adapter. For other applications, the discharge nozzle 5 can have other external contours.

FIG. 4 to FIG. 6 show a second exemplary embodiment of the fluid discharge head 1, which differs from the first exemplary embodiment described previously in that the bush 24 here is formed on an inserted component 29, which is fixed between the inner sleeve 7 and the upper end 13 of the discharge nozzle 5. For this purpose, the component 29 can be provided in the manner of a spider with legs 30, which can be used for positioning on the inner sleeve 7. Furthermore, swirl ducts 31 can be formed on the bush 24 integrated into the component 29. Via the swirl ducts 31, a selectable spray pattern can be imparted to the medium emerging from the chamber 28.

Furthermore, the second exemplary embodiment differs from the first exemplary embodiment in that the medium duct 8 joins a discharge section 26 in the form of a medium chamber, which is shut off or secured against a reverse flow of medium by a valve, in particular a ball valve 32. The fluid discharge head 1 according to the invention can in this case be combined with a large number of different discharge and conveying systems 33.

Otherwise, the above explanations relating to the first exemplary embodiment apply in a corresponding way to the second exemplary embodiment.

According to a third exemplary embodiment, as represented in FIG. 7 and FIG. 8, a fluid discharge head 1 is devised which can be tested for leaks on the assembly line. This fluid discharge head is devised in which checking of various routes of the pressure drop is made possible. As a result, complete checking for tightness is possible.

For this it is provided a fluid discharge head having a discharge nozzle 5 having a discharge opening 6 and in which there is arranged an inner sleeve 7 which has a medium duct 8 and holds a spring-loaded valve body 10 which automatically closes the discharge opening 6 and, as an axially displaceable piston having an upper 14 and a lower valve seat 15 for the piston ends 16, 17, is arranged in a pot-shaped end of the inner sleeve 7. The pot-shaped end 11 forms a cylinder chamber 12 for the valve body 10 with an inner passage duct 21, and the pot-shaped end 11 has a wall opening 42 between the cylinder chamber 12 and an interior 43 of the discharge nozzle 5.

The pot-shaped end 11 has a wall opening 42 between the cylinder chamber 12 and an interior 43 of the discharge nozzle 5. FIG. 8 shows the sealing points that can be checked and the possible routes of the pressure drop V1, V2 and V3 in the event of leaks. For this purpose, an air pressure P is applied in the direction of the medium guide 47 (cf. FIG. 7). If the intermediate valve plate 18 does not seal off with respect to the upper valve seat 14 and/or the valve seat 15 does not seal, air penetrates through the wall opening 42 into the interior 43 and can be measured as a pressure drop V2. Leaks in the region of the valve seat 14 can be measured as a pressure drop V1. Leaks between the inner sleeve 7 and the discharge nozzle 5 can be measured as a pressure drop V3.

At the pot-shaped end 11, the fluid discharge head 1 also has an external cam 44 which, as a stop, interacts with a rib 45 on an inner wall 48 of the discharge nozzle 5 during a movement of the inner sleeve 7 that is directed axially upwards.

The medium duct 8 of the discharge nozzle 5, which is used to forward the fluid discharged from the medium container, adjoins a discharge section 26 in the form of a discharge duct belonging to the mating piece 4. The opening width of the duct 26 can be chosen and can be matched to the desired delivery quantity via insert pieces. The ducts 26, 8 and 21 are preferably placed one above another along a central axis.

The discharge nozzle 5 here has the form of a nasal olive, in order to be able to be placed on the mating piece 4 as a nasal adapter. For other applications, the discharge nozzle 5 can have other external contours.

Otherwise, the above explanations relating to the first and second exemplary embodiment apply in a corresponding way to the fluid discharge head.

The invention claimed is:

1. A fluid discharge head, comprising:
- a discharge nozzle, comprising:
  - a discharge opening in the discharge nozzle; and
  - an upper valve seat adjacent the discharge opening;
- an inner sleeve arranged on an interior of the discharge nozzle, comprising:
  - a medium duct in the inner sleeve;
  - a cylindrical chamber in the inner sleeve in communication with the medium duct; and
  - a lower valve seat;
- a valve body within the cylindrical chamber, comprising:
  - a cylindrical piston comprising a first piston end seated in the upper valve seat and a second piston end seated in the lower valve seat;
  - a passage duct in the cylindrical piston;
  - an intermediate valve plate extending off an outer surface of the valve body between the first piston end and the second piston end;
- a spring within the cylindrical chamber and applying a load to the valve body;
- a pressure chamber in fluid communication with the medium duct and defined by the intermediate valve plate, the inner sleeve, and the discharge nozzle;
- wherein the intermediate valve plate comprises a peripheral sealing lip which guides the valve body in the cylindrical chamber; and
- wherein the cylindrical chamber in the inner sleeve comprises a shoulder wherein an end of the spring rests on the shoulder.

2. The fluid discharge head of claim 1, further comprising a pilot pressure within the pressure chamber between 1.5 and 2.3 bar.

3. The fluid discharge head of claim 1, wherein the second piston end comprises a funnel shaped piston end.

4. The fluid discharge head of claim 1, wherein the inner sleeve further comprises a connecting element.

5. The fluid discharge head of claim 1, wherein the medium duct and the passage duct are in communication.

6. The fluid discharge head of claim 1, wherein the passage duct is through the center of the cylindrical piston.

7. The fluid discharge head of claim 1, wherein the upper valve seat comprises a bush.

8. The fluid discharge head of claim 7, wherein the bush is integral to the discharge head.

9. The fluid discharge head of claim 7, wherein the bush is an insert in an end of the discharge head.

10. A fluid discharge head, comprising:
- a discharge nozzle, comprising:
  - a discharge opening in one end of the discharge nozzle; and
  - an upper valve seat adjacent the discharge opening;
- an inner sleeve arranged on an interior of the discharge nozzle, comprising:
  - a first end adjacent the discharge nozzle;
  - a second end opposite the first end;
  - a lower valve seat between the first end and the second end;
  - a cylindrical chamber in the inner sleeve extending from the first end to a shoulder adjacent the lower valve seat; and
  - a medium duct in the inner sleeve extending from the second end to the lower valve seat;
- a spring-loaded valve body seated in the cylindrical chamber, comprising:
  - a cylindrical piston having a first piston end seated in the upper valve seat and a second piston end opposite the first piston end and seated in the lower valve seat;
  - a passage duct through the cylindrical piston;
  - an intermediate valve plate extending off an exterior of the spring-loaded valve body between the first piston end and second piston end, wherein the intermediate valve plate seals against an interior surface of the cylindrical chamber between the upper valve seat and the lower valve seat forming a pressure chamber between the intermediate valve plate and the upper valve seat;

a spring seated in the cylindrical chamber between the shoulder and an underside of the intermediate valve plate.

11. The fluid-discharge head of claim 10, further comprising a funnel at the second piston end and an annular groove in the spring-loaded valve body between the first piston end and the intermediate valve plate, wherein the passage duct extends from the funnel to the annular groove.

* * * * *